United States Patent
Traverso et al.

(10) Patent No.: US 10,425,266 B2
(45) Date of Patent: Sep. 24, 2019

(54) METHOD FOR REDUCING THE PEAK FACTOR OF A MULTICHANNEL EMISSION BY ADAPTIVE AND INTELLIGENT CLIPPING/FILTERING

(71) Applicant: THALES, Courbevoie (FR)

(72) Inventors: Sylvain Traverso, Gennevilliers (FR); Jean-Luc Rogier, Gennevilliers (FR); Jean-Yves Bernier, Tubize (BE)

(73) Assignee: THALES, Courbevoie (FR)

( * ) Notice: Subject to any disclaimer, the term of this patent is extended or adjusted under 35 U.S.C. 154(b) by 31 days.

(21) Appl. No.: 15/560,478

(22) PCT Filed: Apr. 7, 2016

(86) PCT No.: PCT/EP2016/057633
§ 371 (c)(1),
(2) Date: Sep. 21, 2017

(87) PCT Pub. No.: WO2016/162429
PCT Pub. Date: Oct. 13, 2016

(65) Prior Publication Data
US 2018/0062898 A1    Mar. 1, 2018

(30) Foreign Application Priority Data

Apr. 10, 2015   (FR) ...................... 15 00738

(51) Int. Cl.
*H04L 27/26* (2006.01)
*H04L 25/03* (2006.01)

(52) U.S. Cl.
CPC .... *H04L 27/2623* (2013.01); *H04L 25/03828* (2013.01); *H04L 27/26* (2013.01); *H04L 27/2614* (2013.01)

(58) Field of Classification Search
CPC .................................................. H04L 27/2623
(Continued)

(56) References Cited

U.S. PATENT DOCUMENTS

| 7,313,373 B1 * | 12/2007 | Laskharian | .............. | H04B 1/04 455/127.1 |
| 2002/0154760 A1 * | 10/2002 | Branden | ............. | H04M 7/1295 379/386 |

(Continued)

FOREIGN PATENT DOCUMENTS

| EP | 2 458 770 A1 | 5/2012 |
| WO | 2013/123580 A1 | 8/2013 |

OTHER PUBLICATIONS

Kimura, Satoshi; Nakamura, Takashi; Saito, Masato; Okada, Minoru; PAR Reduction for OFDM signals based on Deep Clipping, ISCCSP 2008, Malta, Mar. 12-14, 2008 (Year: 2008).*

(Continued)

*Primary Examiner* — Peter G Solinsky
(74) *Attorney, Agent, or Firm* — Baker & Hostetler LLP

(57) ABSTRACT

A method for reducing the peak factor of a signal transmitted in a frequency band comprising several channels, the signal using a plurality of channels in the band comprises: a step of clipping the signal, a step of subtracting the clipped signal from the signal, so as to obtain a peak signal, a step of filtering the peak signal with the aid of a multichannel filter configured to comply with a predetermined spectral mask for each of the channels used by the signal, and a step of subtracting the filtered peak signal from the signal. A device for emitting a multichannel signal implementing the method for reducing the peak factor is also provided.

11 Claims, 5 Drawing Sheets

(58) Field of Classification Search
USPC .......................................................... 370/343
See application file for complete search history.

(56) References Cited

U.S. PATENT DOCUMENTS

| | | | | |
|---|---|---|---|---|
| 2005/0013451 A1* | 1/2005 | Finn | ........................ | H04R 3/02 |
| | | | | 381/110 |
| 2010/0329401 A1* | 12/2010 | Terry | .................. | H04L 27/2615 |
| | | | | 375/346 |
| 2011/0199920 A1* | 8/2011 | Takei | .................... | G01S 13/767 |
| | | | | 370/252 |
| 2011/0228872 A1* | 9/2011 | Soler Garrido | ..... | H04L 27/2623 |
| | | | | 375/295 |
| 2012/0258676 A1* | 10/2012 | Smart | ................ | H03H 17/0263 |
| | | | | 455/127.1 |
| 2013/0163512 A1* | 6/2013 | Rexberg | .............. | H04L 27/2624 |
| | | | | 370/328 |
| 2014/0362950 A1* | 12/2014 | Fehri | ........................ | H04B 1/68 |
| | | | | 375/296 |
| 2014/0362951 A1* | 12/2014 | Fehri | ................... | H04L 27/2623 |
| | | | | 375/297 |
| 2015/0004923 A1* | 1/2015 | Beaudin | ................... | H04B 1/04 |
| | | | | 455/127.2 |
| 2016/0028574 A1* | 1/2016 | Wang | .................... | H04L 27/367 |
| | | | | 375/296 |
| 2016/0173311 A1* | 6/2016 | Farabegoli | ................ | H03F 1/02 |
| | | | | 455/127.1 |
| 2016/0227549 A1* | 8/2016 | Shako | ............... | H04W 52/0261 |
| 2016/0277229 A1* | 9/2016 | Dick | ..................... | H04L 1/0009 |
| 2016/0329920 A1* | 11/2016 | Li | ........................... | H04B 1/525 |
| 2017/0187561 A1* | 6/2017 | Kwon | ................. | H04L 27/2623 |
| 2017/0331650 A1* | 11/2017 | Martinez | ........... | H04L 25/03828 |

OTHER PUBLICATIONS

Chen et al., "Multi-dimensional crest factor reduction and digital predistortion for multi-band radio-over-fiber links," Optics Express, vol. 22, No. 17, Aug. 25, 2014, pp. 20982, XP055254954.

David Lopez et al., "Peak Cancellation and Digital Predistortion of High-Order QAM Wideband Signals for Next Generation Wireless Backhaul Equipment," IEEE 2014 International Workshop on Integrated Nonlinear Microwave and Millimetre-Wave Circuits, Apr. 2, 2014, pp. 1-3, XP032595458.

* cited by examiner

METHOD FOR REDUCING THE PEAK FACTOR OF A MULTICHANNEL EMISSION BY ADAPTIVE AND INTELLIGENT CLIPPING/FILTERING

CROSS-REFERENCE TO RELATED APPLICATIONS

This application is a National Stage of International patent application PCT/EP2016/057633, filed on Apr. 7, 2016, which claims priority to foreign French patent application No. FR 1500738, filed on Apr. 10, 2015, the disclosures of which are incorporated by reference in their entirety.

FIELD OF THE INVENTION

The invention lies in the field of multichannel communications, and relates more particularly to a method for reducing the peak factor of a multichannel signal emitted in the high-frequency band.

BACKGROUND

HF links (the acronym standing for High-Frequency, situated between 3 MHz and 30 MHz) offer a non-line-of-sight communication capacity making it possible to carry out communications at long, or indeed very long distance, without requiring recourse to a satellite or to relay stations.

Hence, HF band communications use the reflection properties of the ionospheric layers for these frequencies. The drawback of the use of this band stems from the fact that, depending on the position of the ionospheric layers, propagation quality is not identical over the whole of the band. Thus, the HF band is generally divided into channels, thereby making it possible to allocate the frequency resource to various users, to afford frequency diversity to a communication, and also to adapt the use of the frequency resource to the transmission quality of the various channels, this quality varying as a function of time of day and geographical position.

Among the communication norms which use the HF band, the MIL STD 188-110C annex F standard, or the proposed STANAG 4539 annex H standard, describe the employment of several distinct 3 kHz channels for communicating. The invention lies in particular within the framework of transmissions of this type, using several 3 kHz channels, but also within the framework of multichannel transmissions using channels of greater width, such as for example in annex D of the MIL STD 188-110C standard, in the HF band or in other frequency bands.

SUMMARY OF THE INVENTION

The invention proposes a method for reducing the peak factor, generally designated by the name PAPR (the acronym standing for Peak-to-Average Power Ratio) of multichannel signals. This PAPR makes it possible to characterize the dynamic range of a signal, that is to say the ratio between the peak power of this signal and its average power. This type of method for reducing the peak factor is generally designated by the acronym CFR (the acronym standing for Crest Reduction Factor).

Transmission signals can be divided into two large families:

so-called constant envelope signals: these signals have a constant instantaneous power as a function of time, their PAPR therefore equals 1 (or 0 dB), and so-called non-constant envelope signals: these signals have a more or less significant variation of instantaneous power as a function of time. For signals of this type, the PAPR can reach values of the order of up to 12 dB.

Multichannel HF signals belong to the family of non-constant envelope signals. Depending on the number of channels used, the PAPR can vary between 3.7 dB (1 carrier) and 12 dB (16 carriers).

In order to maximize the link budget of a communication, it is necessary to amplify the signal before transmitting it. This amplification is generally done with the aid of an analogue power amplifier. Grossly simplifying the behaviour of the power amplifier, it is possible to define three operating zones:

the linear zone: the samples at the output of the power amplifier are a linearly amplified version of the samples at the input of the power amplifier, the compression zone: the samples at the output of the power amplifier are compressed by the non-linearity of the power amplifier, the saturation zone: the samples at the output of the power amplifier are saturated by the non-linearity of the power amplifier.

The operating point of the power amplifier is called the OBO (the acronym standing for Output BackOff), and corresponds to the difference between the saturation power of the power amplifier and the average power, at the output of the power amplifier. This operating point is related to the PAPR of the signal to be transmitted. Indeed, the peak power of the power amplifier being fixed, the average power, and therefore the efficiency of the amplifier, is all the lower the higher the PAPR.

The higher the operating point, the more significant the efficiency of the amplifier is. Low efficiency is synonymous with high consumption and increasing size of the power amplifier. The use of an overly high operating point causes the amplification of a part of the signal in the nonlinear zone of the power amplifier (compression zone and saturation zone), thereby degrading the spectrum of the signal emitted.

The signals to be transmitted generally having to comply with very constraining spectral masks, the reduction in the PAPR of the signal to be transmitted in compliance with these constraints is therefore a key point of the performance of a radio set.

Various techniques for reducing the PAPR of a signal to be transmitted are known in the prior art.

A first technique, known by the term clipping, consists in limiting the power peaks of the signal to be transmitted so as to reduce the PAPR. Since clipping the signal degrades the spectrum of the emitted signal, these solutions very quickly become ineffective when it is necessary to adhere to a demanding spectral mask.

A second technique consists in using solutions based on coding, which effectively reduces the dynamic range in terms of power of the signal while ensuring perfect adherence to a spectral emission mask. The drawback of these solutions stems from the decrease in the spectral efficiency naturally induced by coding techniques. Moreover, these solutions are often complex to implement and require processings coupled to the modem.

A third technique relies on extensions of constellations. Solutions based on constellation extension effectively reduce the dynamic range in terms of power of the signal while ensuring perfect adherence to a spectral emission mask. However, the major drawback of these solutions is the low capacity for PAPR reduction when few parallel channels are considered (multicarrier modulation with few carriers).

Moreover, these solutions are often complex to implement and require processings coupled to the modem.

Finally, a fourth technique consists in adding some signal to the useful signal before passing through the power amplifier. This signal generally lies outside the useful band, and will be suppressed by the emission radio filter situated at the output of the radio chain. This technique requires the use of a more wideband amplifier, and of an emission radio filter which is adjusted precisely to the mask of the emitted signal, and which can be adjusted to the desired variations in bandwidth. Such filters are generally bulky since they work on signals with large powers.

Procedures are known, as in international application PCT WO 2013/123580 A1, which combine clipping and signal addition. However, in the patent application, the signal is added outside of the band of the signal, thereby offloading the complexity of embodiment to the emission radio filter. The method for reducing the peak factor disclosed by this application does not make it possible to use the knowledge of the spectral emission mask as a whole in order to reduce the PAPR more effectively, and to exploit the multichannel aspect specific to HF transmissions.

Procedures are also known, such as that presented in the article by Lopez David et al., Peak Cancellation and Digital Predistortion of High-Order QAM Wideband Signals for Next Generation Wireless Backhaul Equipment, 2014 International workshop on integrated non linear microwave and millimeter-wave, 2 Apr. 2014, which combine clipping and filtering of the peak signal of a multicarrier signal. However, the peak signal is filtered by a low-pass filter passing over the whole of the band of the multicarrier signal, which does not make it possible to control the spectral regrowths inside this band.

Finally, the solutions known from the prior art do not make it possible at one and the same time:
to be agnostic regarding the type of modulation transmitted,
to use the whole set of channels available for transmission, and
to effectively reduce the PAPR as a function of the spectral emission mask.

Hence, the method according to the invention proposes to combine techniques for clipping the useful signal and for filtering adapted to the emission mask, in order to reduce the peak factor of the signal transmitted. Thus, the method makes it possible to decrease the PAPR by tolerating the transmission of intermodulation products at specific frequencies and power levels, so as to adhere to a predefined spectral mask.

The proposed solution carries out processings on the signal at the output of the modem, upstream of the amplification stage. It does not require any interaction with the modem, and is therefore agnostic of the type of modulation used. It adapts exactly to the spectral emission mask, so as to reduce as far as possible the PAPR of the signal transmitted, and allows the use of additional transmission channels dedicated to reducing the peak factor of the signal.

The invention therefore consists of a method for reducing the peak factor of a signal transmitted in a frequency band comprising several channels, the signal using a plurality of channels in the band. The method is characterized in that it comprises:
a step of clipping the said signal,
a step of subtracting the said clipped signal from the said signal, so as to obtain a peak signal,
a step of filtering the said peak signal with the aid of a multichannel filter configured to comply with a predetermined spectral mask for each of the channels used by the signal, and
a step of subtracting the filtered peak signal from the signal.

Advantageously, the spectral mask of the multichannel filter is predetermined for each of the channels as a function of a maximum admissible power level in sub-bands of this channel and of its adjacent channels.

According to one embodiment of the method, at least one channel of the said frequency band is not used by the signal.

In another embodiment of the method, the multichannel filter is furthermore adapted so as not to reject at least one channel, not used by the signal, of the frequency band.

Advantageously, the frequency band channel not used by the said signal is selected from among the channels whose signal-to-noise ratio is the worst.

According to another embodiment of the method, the step of clipping the signal is a deep clipping, making it possible to limit the power regrowths of the filtered signal.

According to another embodiment of the method, the steps of clipping the signal, of obtaining a peak signal, of filtering the peak signal, and of subtracting the filtered peak signal from the signal are carried out iteratively.

Advantageously, the step of filtering the signal of peaks uses a multichannel filter embodied on the basis of a prototype filter associated with a spectral mask, the said multichannel filter being obtained by the summation of the said prototype filter shifted in frequency for each of the channels.

Advantageously, the steps are carried out on a baseband digital signal, at modem output.

The invention also relates to a device for emitting a signal in a frequency band comprising several channels, the said signal using a plurality of channels in the band. The device is characterized in that it implements a method for reducing the peak factor of the said signal described previously, and comprising:
a module for clipping the signal,
a module for calculating a peak signal, by subtracting a clipped signal from the said signal,
a module for filtering a peak signal with the aid of a multichannel filter configured to comply with a predetermined spectral mask for each of the channels used by the signal,
a module for subtracting a filtered peak signal from the said signal.

According to one embodiment, the emission device transmits in the High-Frequency band.

BRIEF DESCRIPTION OF THE DRAWINGS

The invention will be better understood and other characteristics and advantages will be better apparent on reading the nonlimiting description which follows, and by virtue of the appended figures among which.

DETAILED DESCRIPTION

The invention therefore applies to a signal composed of several channels, each of them having a bandwidth that may be identical or different, the various channels being able to be allotted to various transmissions (such as for example in the case of a signal emitted from a GSM base station), or to one and the same transmission.

The signal is emitted by an emission item of equipment comprising a modem intended to shape the signal, and of a radio chain comprising elements making it possible to transpose the signal on carrier frequency and at least one power amplifier.

The signal emitted has a bandwidth corresponding to the width of the emission radio filter situated downstream of the power amplifier, or, if this filter does not exist, to the distance between the channel at the highest frequency and the channel at the lowest frequency of the transmission.

In the case of HF transmissions, the quality of the propagation channels varies in the course of a day. Depending on the time, certain channels are propitious to transmissions, while others exhibit a very degraded signal-to-noise ratio, rendering their use difficult, or indeed impossible.

The allocations of channels to transmissions are therefore carried out on a case by case basis, dynamically, and may evolve over time. Such is the case for example in European patent application EP 2458 770 A1.

The various channels making up the signal to be transmitted are not systematically adjacent. Therefore, the implementation of an efficacious solution for filtering the signal may not be carried out on the basis of a single filter whose passband corresponds to the total useful band of the signal, but on the basis of a filter adapted to the channel allocations.

Figure 1:
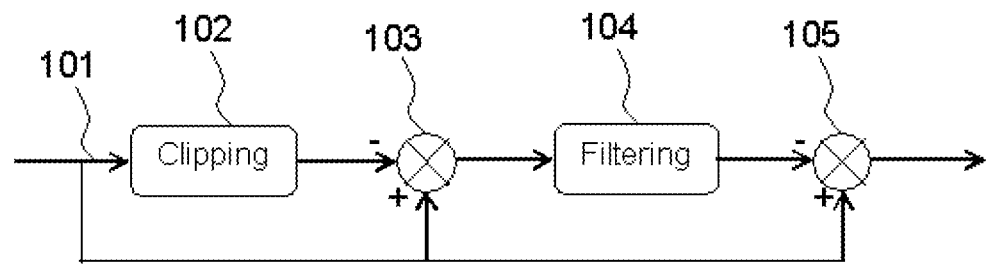
FIG. 1 presents the steps implemented by the method according to an embodiment of the invention.

FIG. 1 presents the steps implemented by the method for reducing the PAPR of a multichannel signal according to an embodiment of the invention.

The method comprises a step 102 of clipping the multichannel signal 101.

During this clipping step, the power of the signal is compared with a threshold. When it is greater than this threshold, the value of the signal is adjusted in such a way that the power of the signal is less than or equal to the value of the threshold. When the power is less than or equal to the threshold, the signal is not modified.

The value of the threshold is positioned as a function of the target PAPR sought by the method.

A second step 103 consists in generating a peak signal by computing the difference between the signal to be transmitted and the clipped signal produced during step 102. This peak signal corresponds to the signal part that was attenuated during the clipping step. Outside of the temporal intervals associated with the peaks, the peaks signal is zero, thereby making it possible to reduce the complexity of calculation of the filtering step.

Working on a peak signal rather than on the clipped signal during the filtering step, also makes it possible to ensure better integrity of the useful signal in the useful channels.

A third step 104 consists in filtering the peak signal, with the aid of a multichannel filter adapted to the various channels used by the signal. The frequency response of this multichannel filter is calculated so as to attenuate the spectrum of the peak signal, in a manner differentiated according to frequency, so that its spectral occupancy, outside of the band of the useful channels, is controlled, not necessarily zero but below a spectral emission mask.

Finally, a step 105 of subtracting the filtered peak signal from the input signal makes it possible to obtain an output signal 106 whose peak factor is less than the initial signal 101, and whose mask is adapted to an emission mask.

Figure 2:
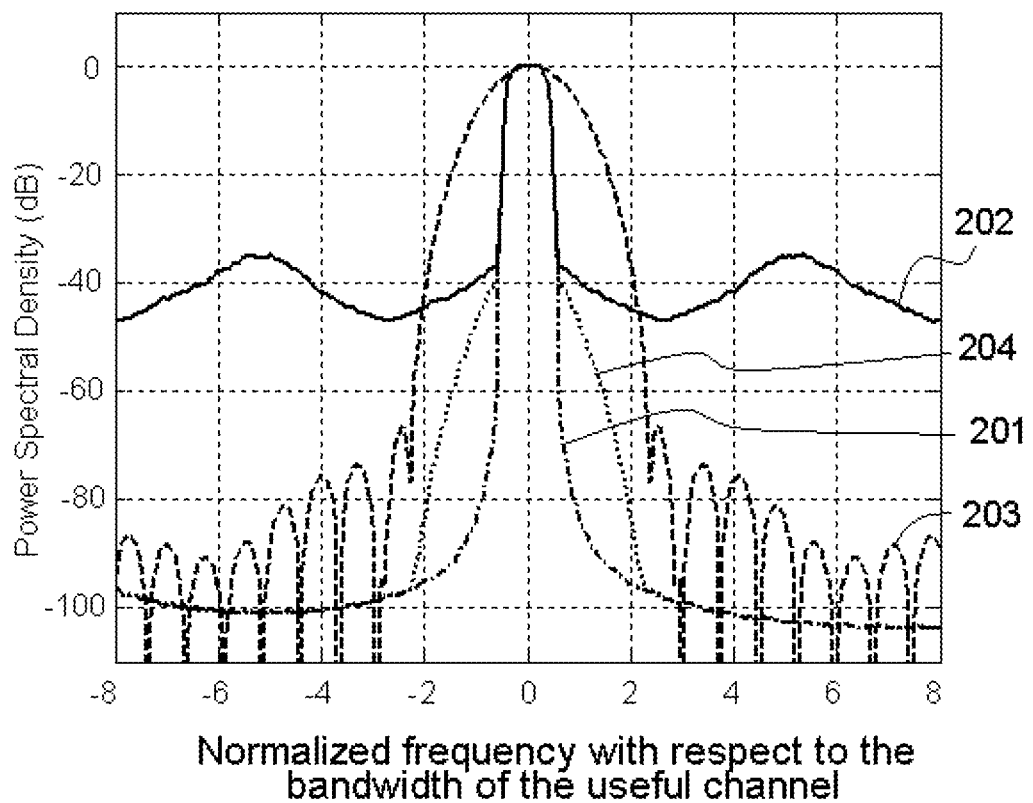
FIG. 2 is a frequency representation of the signal at various steps of the method according to an embodiment of the invention, in which a single carrier is represented.

FIG. 2 is a frequency representation of the signal at various steps of the method according to an embodiment of the invention. In FIG. 2, observation is limited to a single channel.

In the example illustrated by FIG. 2, the assumption is made that the spectral emission mask is hardly constraining on the first adjacent channel, but that it becomes very demanding from the second adjacent channel onwards. Let us consider for example that the level required in the first adjacent channel must be situated at at least −40 dB with respect to the power of the channel considered, while it must be −70 dB in the second adjacent channel. Curve 201, alternating dots and dashes, represents the spectrum of the initial signal on the channel. The solid curve 202 represents the spectrum of a signal which has been clipped to a value close to the target PAPR. The spectrum of this signal requires hardly any filtering on the first adjacent channel (only a few dB), but requires a strong attenuation in order to fit the mask on the second adjacent channel (about 30 dB). The frequency response 203, shown dashed, of the filter proposed in this example is therefore rather more gentle on the first adjacent channel and strong from the second adjacent channel onwards, in such a way that the spectrum of the signal 204, shown dotted, after applying the method according to the invention, complies with the emission mask, while exhibiting a reduced peak factor with respect to the initial signal.

The filtering step being applied solely to the peak signal, the constraints of embodiment of the filter pertain mainly to the out-of-useful-band rejection, thereby making it possible to use a filter whose frequency response is not necessarily flat in the useful band of the signal, without impairing the integrity of the useful signal. Thus, the complexity of the filter (equivalent to the length of its impulse response in the case of a finite impulse response filter) is reduced.

Figure 3:
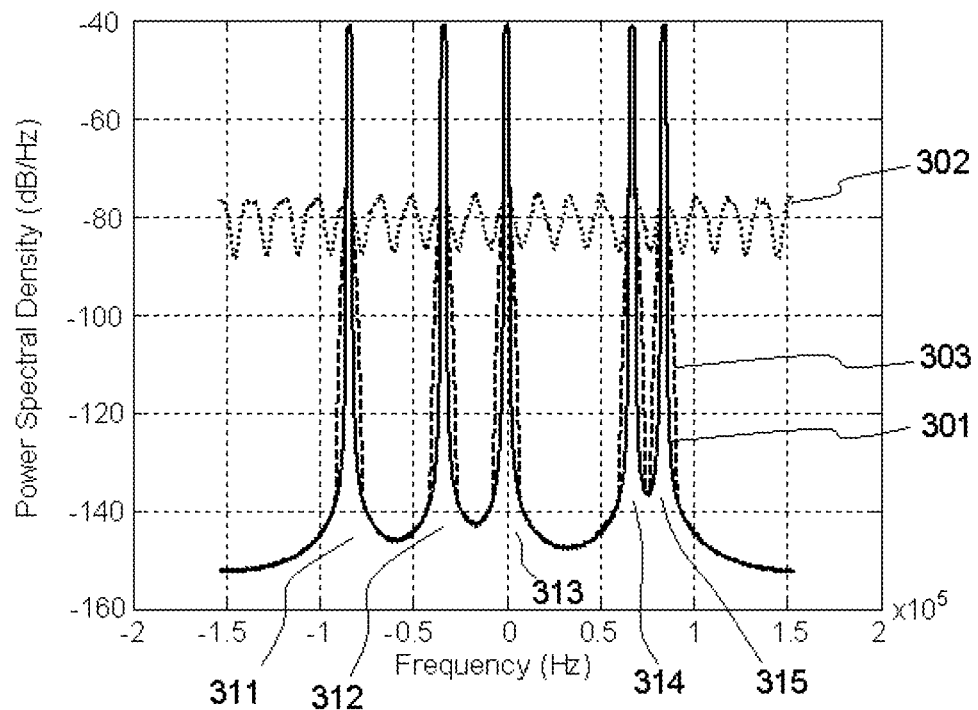
FIG. 3 is a frequency representation of the signal at various steps of the method according to an embodiment of the invention, in which the multichannel signal is transmitted in five channels.

FIG. 3 is a frequency representation of the signal at various steps of the method according to an embodiment of the invention, in which the multichannel signal is transmitted on five channels.

In FIG. 3, the solid curve 301 represents the spectrum of the initial signal, which uses five channels 311, 312, 313, 314 and 315. The channels may or may not be adjacent.

The dotted curve 302 represents the signal after the clipping step. The dashed curve 303 represents the signal after applying the method according to the invention for reducing the peak factor.

In the method according to the invention, the filter adapted to the signal is not a simple low-pass filter whose passband comprises the whole of the useful band of the signal, but a multichannel filter precisely adjusted to the channels used by the signal. When the channels used by the signal change, the multichannel filter must be modified to adapt to the new channels used.

In contradistinction to the use of one or more low-pass filters to filter the peak signal, the objective of the filter or filters being to be passing in the band of the useful signal and blocking outside of this band so as to reject the whole of the clipping noise lying outside the useful band, the multichannel filter used in the invention follows a predetermined mask on each of the channels used.

Such a filter makes it possible to:

comply with a spectral emission mask for each of the channels used, and not a spectral mask for the whole of the multichannel signal, control the intermodulation products corresponding to the peak signal, tolerate spectral regrowth, in a controlled proportion, in the channels used, tolerate spectral regrowth, in a controlled proportion, in the unused channels positioned in the band of the multichannel signal.

In FIG. 3, the multichannel filter therefore follows a spectral mask predetermined by the emission constraints on the adjacent channels inside the band of the multicarrier signal, and is configured so as not to tolerate noise regrowths in the channels not used by the signal (for example the channels situated between the channel 311 and the channel 312). This mask may be identical or different for each of the channels.

The multichannel filter used by the method according to the invention to filter the peak signal can be generated simply by dimensioning firstly a prototype filter with respect to a single baseband channel, as a function of a maximum admissible power level in sub-bands of the channel and adjacent channels.

The type of impulse response used to generate the filter influences the performance of the reduction in the peak factor, but not the method in itself. All types of impulse responses can be envisaged, provided that the filter complies with the rejection constraints given by the desired mask of the signal.

On the basis of this prototype filter whose impulse response is denoted h(n), a multichannel filter $h_{Total}(n)$ is generated in an agile manner, so as to cover the set of channels of the signal, according to the formula:

$$h_{Total}(n) = \sum_{k=0}^{K-1} h(n) \cdot \exp\left[j \cdot 2\pi \cdot F_k \cdot \frac{n}{F_{smp}}\right], \quad (1)$$

with

K the number of channels used by the signal,
$F_k$ the frequency of the K channels, and
$F_{smp}$ the sampling frequency.

Figure 4A:
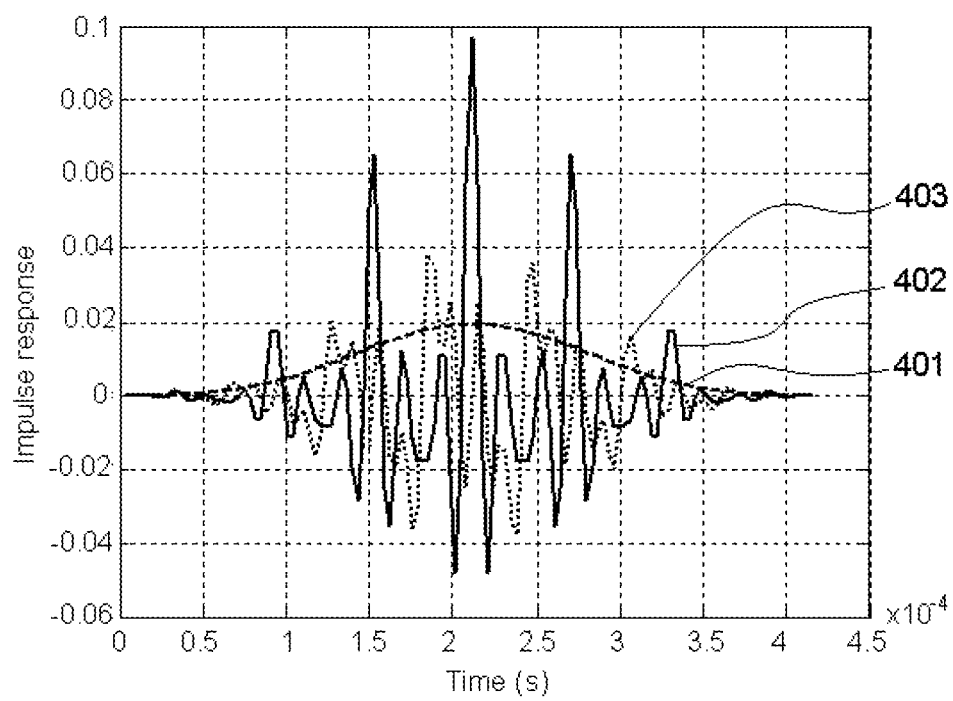
FIG. 4a presents an example of the impulse response of a multichannel filter used in the method according to the invention.

FIG. 4a presents an example of the impulse response of a multichannel filter used in the method according to the invention. The dashed curve 401 is the impulse response of the prototype filter used to generate the multichannel filter. The prototype filter of the example uses an impulse response of "Blackman-Harris" type. The coefficients of this filter are real.

The solid curve 402 and the dotted curve 403 represent the real part and the imaginary part of the impulse response of the multichannel filter used in the method according to the invention.

The multichannel filter thus embodied comprises an identical number of coefficients to the number of coefficients of the prototype filter, independently of the number of channels. Its impulse response is generally complex.

Figure 4B:
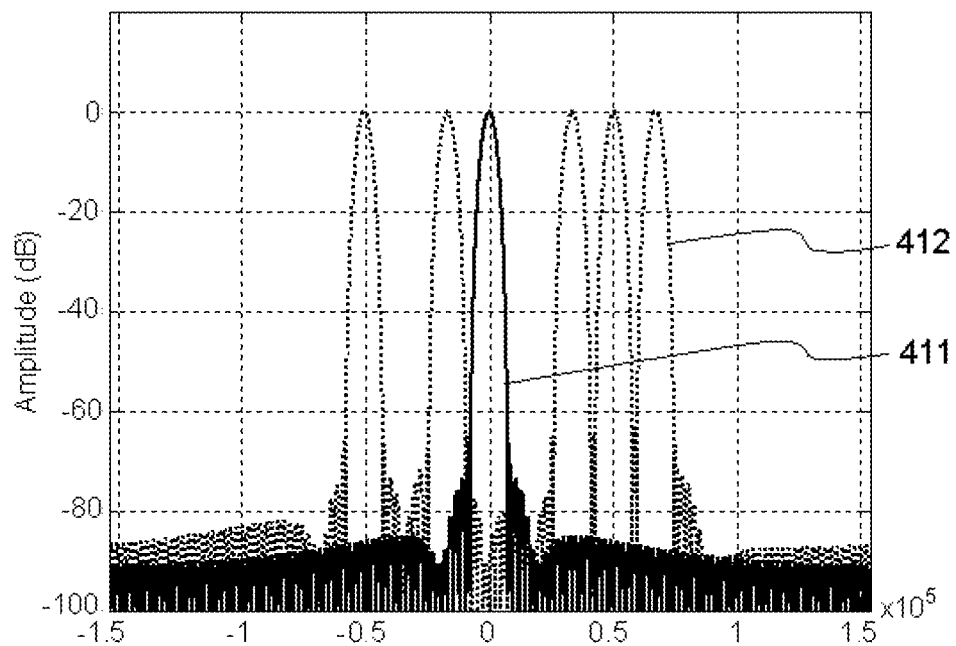
FIG. 4b presents an example of the frequency response of a multichannel filter used in the method according to the invention.

FIG. 4b presents an example of the frequency response of the same multichannel filter, where the solid curve 411 designates the frequency response of the prototype filter, and the dotted curve 412 the frequency response of the multichannel filter.

In the case where the channels do not all have the same width, the multichannel filter can be embodied in an identical way by using several prototype filters of different widths.

Figure 5:
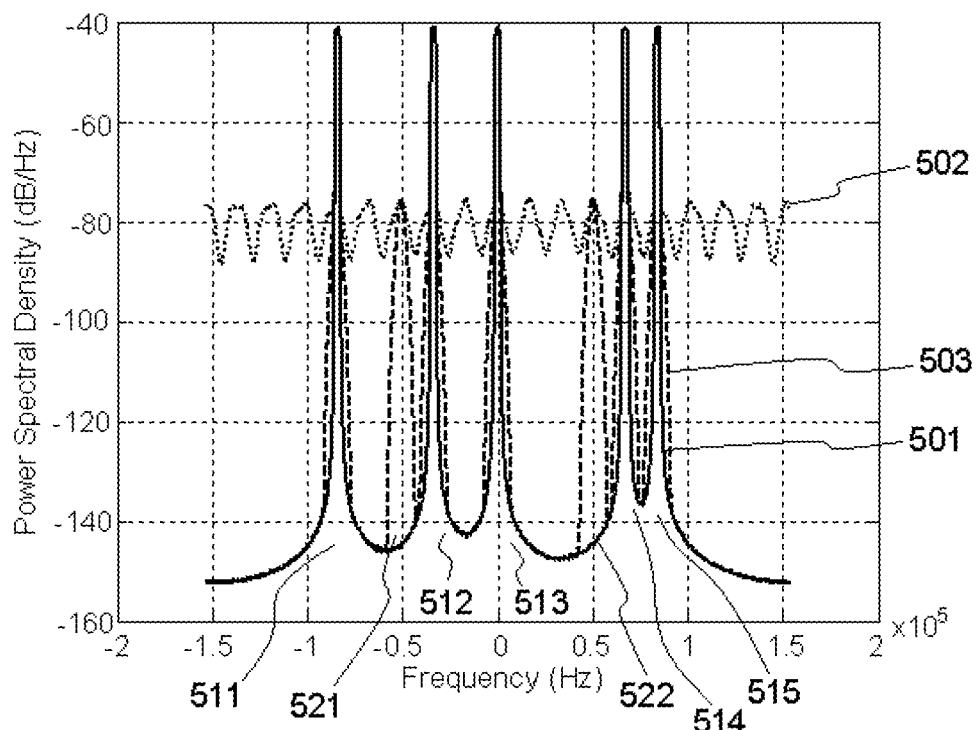
FIG. 5 is a frequency representation of the signal at various steps of the method according to an embodiment of the invention when it is applied to a multichannel signal comprising five channels for the transmission of the useful signal and two channels dedicated to reducing the peak factor.

FIG. 5 is a frequency representation of the signal at various steps of the method according to an embodiment of the invention, when it is applied to a multichannel signal comprising five channels for the useful signal and two channels dedicated to reducing the peak factor.

The invention proposes to use the channels that are not used by the transmission since they exhibit a poor signal-to-noise ratio, to transmit data intended to reduce the peak factor of the signal. These channels are not used to transmit data, and are therefore ignored by the reception item of equipment. Such a principle can be taken into account in the protocols for adapting the waveform to the propagation environment.

The only variation to the embodiment of the invention presented in FIG. 3 resides in the embodiment of the multichannel filter, the latter then being calculated so as not to attenuate the frequencies of the additional channels dedicated to reducing the peak factor in addition to the channels used by the signal.

In FIG. 5, the solid curve 501 represents the initial signal, which uses five channels 511, 512, 513, 514 and 515.

In this example, two additional channels, 521 and 522, are used to reduce the PAPR of the signal. The number of additional channels can vary, and is limited only by the frequency resource. The more the number of additional channels increases, the better the performance of the method for reducing the peak factor.

The dotted curve 502 represents the signal subsequent to the clipping step. The dashed curve 503 represents the signal after applying the method according to the invention for reducing the peak factor.

The use of a multichannel filter, designed so as not to attenuate the frequencies of the channels 521 and 522 during the filtering of the peak signal 502, causes a spectrum regrowth in the channels 521 and 522, the regrowth being compatible with the spectral mask constraints.

The generation of a multichannel filter such as this can be done in an identical manner to the procedure exhibited in equation (1), taking into account the additional channels 521 and 522.

The method according to the invention then uses channels that are not allocated to the transmission of the useful signal, such as for example the carriers whose signal-to-noise ratio hinders the use for the transmission of data. The multichannel filter adapted to each of the channels that are used makes it possible to select the channels in or outside of the useful band of the signal. The use of a multichannel filter generated on the basis of a predetermined spectral mask calculated for each channel, whether these be channels used by the signal, channels not used by the signal but used to favour the reduction in the peak factor, or unused channels, makes it possible to guarantee compliance with regulatory signal emission constraints, be it globally or channel by channel.

As regards the hardware architecture of the emitter, the use of a single multichannel filter rather than of N filters each associated with a channel offers great flexibility of adaptation to the number of channels used, to their position and to the use of channels dedicated to reducing the peak factor. Such adaptability in an architecture where the filtering is carried out for each of the channels makes it necessary to provide a processing chain per channel in the band of the emitter, thus increasing its complexity, its cost and its consumption.

So as to improve the performance of the method, it is possible to use, during the signal clipping step, a deep clipping mechanism.

In contradistinction to traditional clipping, which limits the output power and fixes it at the value of a threshold for any power greater than this threshold, deep clipping consists in decreasing the output power for any signal exceeding a threshold. Deep clipping therefore compresses the peak signal to a lower value than the PAPR sought.

Figure 6:
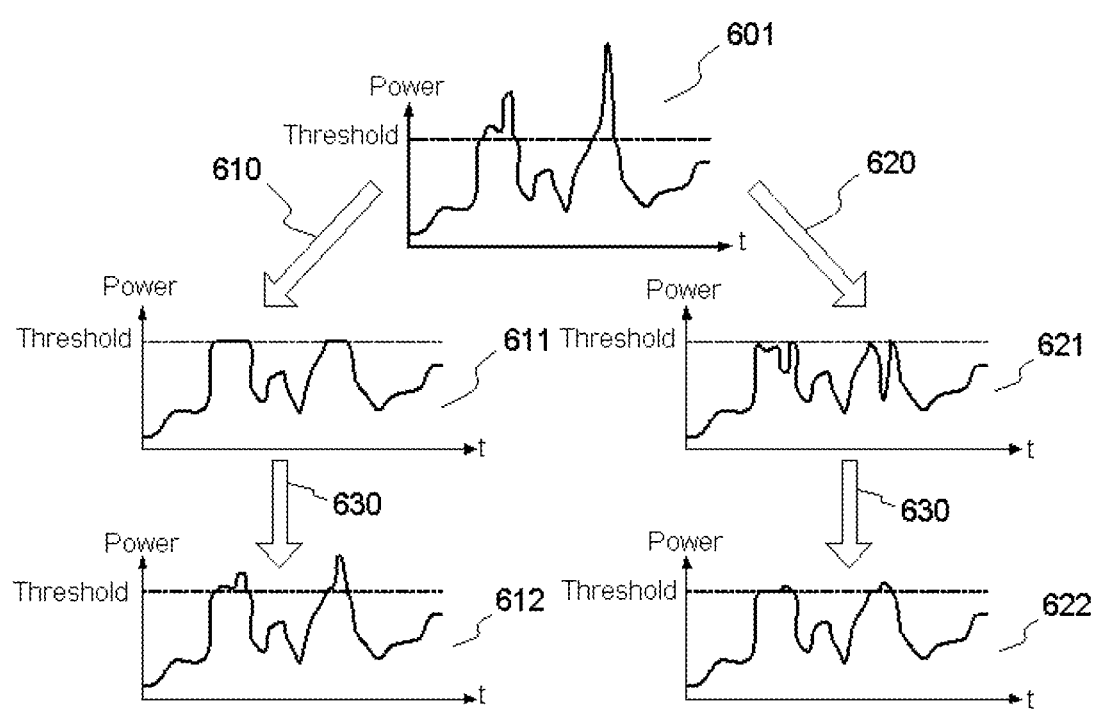
FIG. 6 illustrates the difference between the deep clipping mechanism and a traditional clipping, FIG. 7 gives the performance of the method for reducing the peak factor according to the invention in one of its embodiments.

FIG. 6 describes the deep clipping mechanism, comparing it with the traditional clipping.

Curve 601 represents the evolution over time of the power of the useful signal to be transmitted. This power is compared with a threshold, the role of the clipping mechanism being to limit the power of the signal to this threshold.

Curve 611 represents the power of the signal, after a traditional clipping step 610. The signal whose power exceeds the threshold has been modified in such a way that the power of the clipped signal is now limited to the value of the threshold.

Curve 612 represents the power of the signal, after a step 630 of filtering the signal clipped by the traditional clipping procedure. On account of its nature, the filtering causes a upswing in the peaks of the power of the clipped and filtered signal to values greater than the threshold.

The deep clipping mechanism implements the following relation:

$$\text{out}_{DeepClipping}(n) = p(n) \cdot \exp[j \cdot \varphi(n)], \quad (2)$$

with:

$$p(n) = \begin{cases} |\text{in}_{DeepClipping}(n)| & \text{if } |\text{in}_{DeepClipping}(n)| \leq Thresh \\ Thresh + a_0 \cdot (|\text{in}_{DeepClipping}(n)| - Thresh) & \text{if } |\text{in}_{DeepClipping}(n)| > Thresh \end{cases}, \quad (3)$$

and $$\varphi(n) = \text{Arg}[\text{in}_{DeepClipping}(n)], \quad (4)$$

where:

$\text{in}_{DeepClipping}$ (n) is the input signal of the deep clipping algorithm,
$\text{out}_{DeepClipping}$ (n) is the output signal of the deep clipping algorithm,
$a_0$ is the slope of the deep clipping algorithm,
Thresh is the threshold of the deep clipping algorithm,
Arg[x] is the function giving the phase of the signal x.

Curve 621 represents the power of the signal, after a deep clipping step 620. The signal whose power exceeds the threshold has been modified, in such a way that the power of the clipped signal is less than the value of the threshold by a level inversely proportional to the power level by which the initial signal is exceeded.

Curve 622 represents the power of the signal, after a step 630 of filtering the signal clipped by the deep clipping procedure. The regrowths observed in the peaks of the power of the signal are much lower than the regrowths observed when using the traditional clipping procedure.

Figure 7:
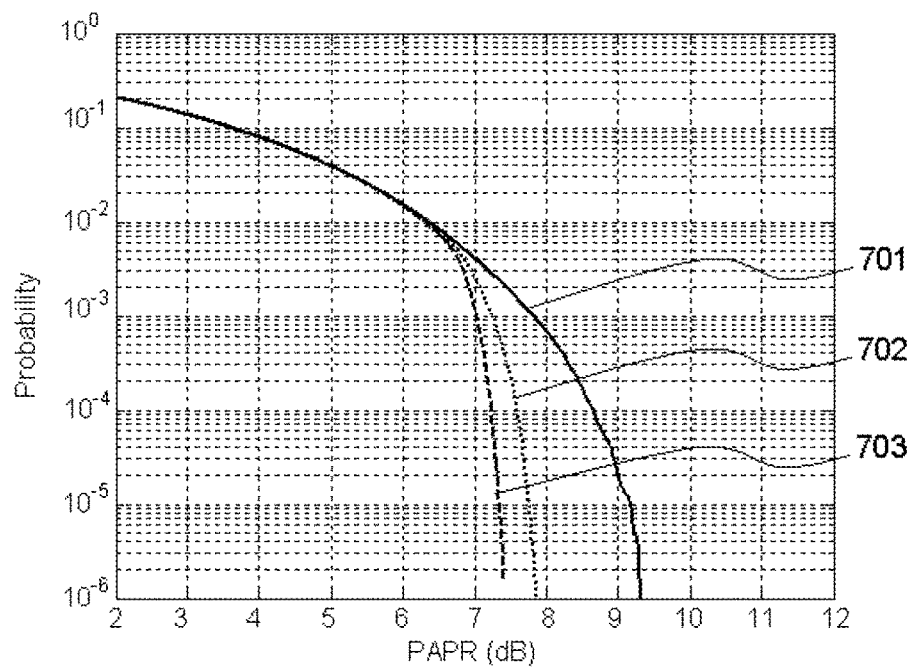

FIG. 7 gives the performance of the method for reducing the peak factor according to the invention in one of its embodiments.

In FIG. 7, the solid curve 701 gives the distribution function for the peak factor of a signal transmitted on 5 channels.

The dotted curve 702 gives the distribution function for the peak factor of the same signal, after applying the method according to an embodiment of the invention. In this specific case and with respect to constraints of the spectral mask, the gain in peak factor is about 1.5 dB.

The dashed curve 703 gives the distribution function for the peak factor of the signal, after applying the method according to an embodiment of the invention. In this case, two additional channels have been allocated to the transmission, so as to further reduce the peak factor, affording a gain in the PAPR, of the order of an additional 0.5 dB.

Figure 8:
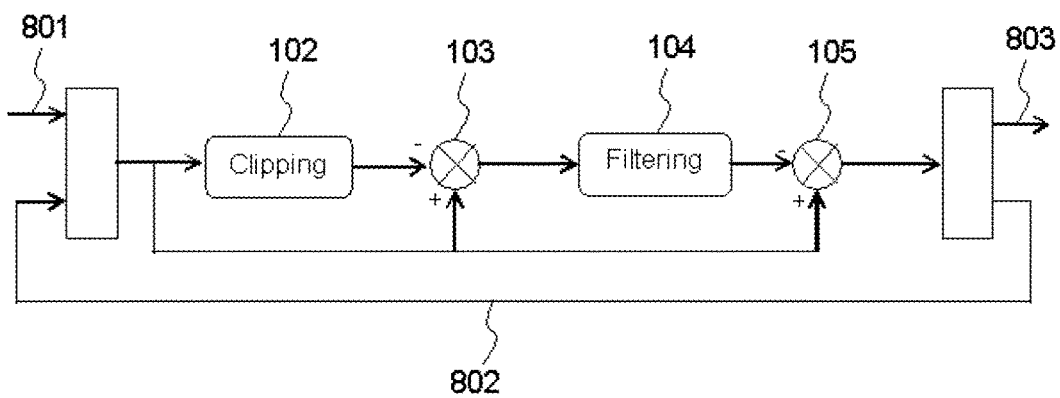
FIG. 8 presents the method according to an iterative embodiment of the invention.

In another embodiment of the invention, described in FIG. 8, the steps of clipping 102, of determining a peak signal 103, of filtering the peak signal 104, and of subtracting the filtered peak signal from the initial signal 105, which are described in the method, are applied to the signal 801 originating from the modem. The resulting signal 802 is looped back, and the various steps of the method according to the invention are applied thereto again. Each iteration makes it possible to improve the peak factor gain.

Indeed, as illustrated at 622 in FIG. 2, although the principle of deep clipping, associated with the filtering of the peaks, is effective and limits the regrowths in the peaks, the latter remain unavoidable. It may then be advantageous to repeat these operations one or more times so as to converge towards an output signal 803 reaching a target PAPR.

The iterations make it possible to find an optimal solution of the relation x−f(x)=0 in the form x(i+1)=f(x(i)), each iteration making it possible to improve the gain in terms of peak factor reduction, doing so as long as a maximum number of iterations is not reached.

The use of a deep clipping mechanism makes it possible to decrease the number of iterations required for obtaining a given target PAPR.

The method according to the invention applies to a digital signal at modem output and upstream of the emission radio chain, preferably but not limitingly in baseband. The various modules executing the various steps of the method can be code portions recorded in a non-volatile memory, and intended to be executed on a calculation machine such as for example a reprogrammable calculation machine (a processor or a microcontroller for example) or a dedicated calculation machine (for example a set of logic gates such as an FPGA or an ASIC), or any other hardware module.

It can also apply to an analogue signal, since it calls only upon power limiters (such as for example a diode based limiter), analogue filter banks, delay lines and differential summators or amplifiers.

The method is intended to be implemented in a radio-communications device emitting a signal using several channels. This device can be configured to emit in the HF band, but can also emit in the other frequency bands, and in a propagation environment other than a wireless radio environment, such as for example a wired network or a fibre optic network.

The advantages of the method according to the invention are as follows:

the method is totally transparent to the type of modulation transmitted on each of the channels, it is positioned at the output of the modem and requires only the knowledge of the channels used and of the spectral emission mask associated with each of the transmission channels, the method offers a good PAPR reduction capacity: the use of deep clipping makes it possible to limit the regeneration of the peaks caused by the filtering step, and can if necessary be associated with an iterative mechanism, the method makes it possible to effectively reduce the PAPR as a function of the spectral emission mask: the proposed solution makes it possible to adapt exactly to an spectral emission mask and to the channels available so as to optimize the PAPR/out-of-band emission level compromise, the method makes it possible to occupy the whole set or a subset of channels available for transmission, such as the transmission channels which are not occupied for the transmission of useful data but which are relevant in reducing the PAPR, its complexity of implementation is limited, this being due in particular to the use of a fairly non-complex multi-band filter, whose constraints in the band of each useful channel are weak, the filtering step is carried out on a peak signal, thereby simplifying the filtering work, and making it possible to avoid degrading the useful signal, the method can be implemented digitally, on a baseband signal at modem output, or by using analogue hardware components.

The invention claimed is:

1. A method for reducing the peak factor of a signal transmitted in a frequency band comprising several channels, the signal using a plurality of channels in the band, comprising:
   a step of clipping the said signal,
   a step of subtracting the said clipped signal from the said signal, so as to obtain a peak signal,
   a step of filtering the said peak signal with the aid of a multichannel filter configured to comply with a predetermined spectral mask for each of the channels used by the signal, and
   a step of subtracting the filtered peak signal from the signal.

2. The method for reducing the peak factor of a signal transmitted in a frequency band comprising several channels according to claim 1, wherein the spectral mask of the said multichannel filter is predetermined for each of the channels as a function of a maximum admissible power level in sub-bands of this channel and of its adjacent channels.

3. The method for reducing the peak factor of a signal transmitted in a frequency band comprising several channels according to claim 1, wherein at least one channel of the said frequency band is not used by the signal.

4. The method for reducing the peak factor of a signal transmitted in a frequency band comprising several channels according to claim 2, wherein the said multichannel filter is furthermore adapted so as not to reject at least one channel, not used by the said signal, of the frequency band.

5. The method for reducing the peak factor of a signal in a frequency band comprising several channels according to claim 4, wherein the at least one channel not rejected by the multichannel filter is selected from among the channels of the frequency band, not used by the said signal, having the lowest signal-to-noise ratio.

6. The method for reducing the peak factor of a signal transmitted in a frequency band comprising several channels according to claim 1, wherein the step of clipping the signal is a deep clipping.

7. The method for reducing the peak factor of a signal transmitted in a frequency band comprising several channels according to claim 1, wherein the said steps of clipping the signal, of obtaining a peak signal, of filtering the peak signal, and of subtracting the filtered peak signal from the signal are carried out iteratively.

8. The method for reducing the peak factor of a signal transmitted in a frequency band comprising several channels according to claim 1, wherein the said step of filtering the signal of peaks uses a multichannel filter embodied on the basis of a prototype filter associated with a spectral mask, the said multichannel filter being obtained by the summation of the said prototype filter shifted in frequency for each of the channels.

9. The method for reducing the peak factor of a signal in a frequency band comprising several channels according to claim 1, wherein the steps are carried out on a baseband digital signal, at modem output.

10. A device for emitting a signal in a frequency band comprising several channels, the said signal using a plurality of channels in the band, comprising:
    a module for clipping the signal,
    a module for calculating a peak signal by subtracting a clipped signal from the said signal,
    a module for filtering a peak signal with the aid of a multichannel filter configured to comply with a predetermined spectral mask for each of the channels used by the said signal,
    a module for subtracting a filtered peak signal from the said signal.

11. The device for emitting a signal in a frequency band comprising several channels according to claim 10, wherein the said signal is transmitted in the High-Frequency band.

* * * * *